United States Patent
Wakuta et al.

(10) Patent No.: US 7,089,007 B2
(45) Date of Patent: Aug. 8, 2006

(54) METHOD AND APPARATUS FOR PERFORMING HANDOFF BY VARYING THRESHOLD LEVEL

(75) Inventors: Tatsuya Wakuta, Kawasaki (JP); Hitoshi Koike, Kawasaki (JP); Ryuichi Sato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/142,802

(22) Filed: Jun. 1, 2005

(65) Prior Publication Data

US 2005/0221828 A1    Oct. 6, 2005

Related U.S. Application Data

(62) Division of application No. 09/597,935, filed on Jun. 20, 2000, now abandoned.

(30) Foreign Application Priority Data

Sep. 2, 1999   (JP)   ................................ 11-248335

(51) Int. Cl.
    *H04Q 7/20*   (2006.01)
(52) U.S. Cl. ...................... 455/436; 455/437; 455/438; 370/331; 370/332
(58) Field of Classification Search ........ 455/436–444, 455/450–453, 456.1, 456.5, 456.6, 509, 512–513, 455/515–517, 524–525; 370/331–335, 328
    See application file for complete search history.

(56) References Cited

U.S. PATENT DOCUMENTS

| 4,398,063 | A | * | 8/1983 | Hass et al. .................. 455/436 |
| 5,475,861 | A | | 12/1995 | Hall |
| 5,594,943 | A | | 1/1997 | Balachandran |
| 6,021,123 | A | * | 2/2000 | Mimura ...................... 370/331 |
| 6,161,015 | A | * | 12/2000 | Birchler et al. ............. 455/440 |
| 6,263,205 | B1 | | 7/2001 | Yamaura et al. |
| 6,377,563 | B1 | * | 4/2002 | Jeon et al. ................... 370/335 |
| RE37,757 | E | | 6/2002 | Frank et al. |
| 6,430,412 | B1 | | 8/2002 | Hogg et al. |
| 6,496,492 | B1 | | 12/2002 | Zeng |
| 6,507,740 | B1 | | 1/2003 | Shi |
| 6,529,733 | B1 | | 3/2003 | Qing-An |
| 6,542,744 | B1 | | 4/2003 | Lin |
| 6,611,506 | B1 | | 8/2003 | Huang et al. |
| 6,628,949 | B1 | | 9/2003 | Park |
| 6,810,252 | B1 | * | 10/2004 | Kwon ......................... 455/436 |

FOREIGN PATENT DOCUMENTS

| JP | 03-226127 | 10/1991 |
| JP | 07-046647 | 2/1995 |
| WO | 99/57933 | 11/1999 |

* cited by examiner

*Primary Examiner*—Pablo N. Tran
(74) *Attorney, Agent, or Firm*—Katten Muchin Rosenman LLP (57) ABSTRACT

A method and a wireless communication control apparatus for handing off a mobile station in a mobile communication system including at least two wireless base stations. A handoff threshold which is set in the mobile station is varied according to quality of a wireless link between the mobile station and a first wireless base station which currently controls the mobile station. Then, the processing for handing off the mobile station from the first wireless base station to a second wireless base station is performed based on the handoff threshold.

1 Claim, 10 Drawing Sheets

FIG. 1

13 QUALITY-VERSUS-THRESHOLD TABLE

| REVERSE-LINK QUALITY DROP VALUES | FORWARD-LINK QUALITY DROP VALUES | HANDOFF THRESHOLD |
|---|---|---|
| 0.0% | 0.0% | 2.5 dBm |
| 0.0% | 0.1% | 2.4 dBm |
| ⋮ | ⋮ | ⋮ |
| 10.0% | 9.9% | 0.2 dBm |
| 10.0% | 10.0% | 0.1 dBm |

15 HANDOFF NUMBER TABLE

PROVIDED FOR EACH MOBILE STATION

| BASE STATION NUMBER (15-1a) | NUMBER OF OCCURRED HANDOFFS (15-1b) |
|---|---|
| E 3 | 3 |
| C 2 | 4 |
| ... | ... |
| O 8 | 1 |
| C 1 | 1 |

METHOD AND APPARATUS FOR PERFORMING HANDOFF BY VARYING THRESHOLD LEVEL

CROSS-REFERENCE TO RELATED APPLICATION

This application is a divisional of U.S. application Ser. No. 09/597,935 filed on Jun. 20, 2000, now abandoned and claims priority from Japanese Patent Application 11-248335 filed on Sep. 2, 1999, the contents of which are herein wholly incorporated by reference.

BACKGROUND OF THE INVENTION

1) Field of the Invention

The present invention relates to a method and apparatus for handing off a mobile station from a wireless base station to another wireless base station in a mobile communication network.

2) Description of the Related Art

In the field of mobile communications, there are demands for high quality service. In particular, in the current mobile communications, the quality of service is often lowered during operations for achieving a handoff as described below.

The handoff is an operation of transferring control of a mobile station from a first wireless base station to a second wireless base station when the mobile station moves from an area covered by the first wireless base station to another area covered by the second wireless base station. The operations for achieving a handoff is performed based on comparison of at least one reference signal received from at least one wireless base station with a given handoff threshold.

Figure 8:
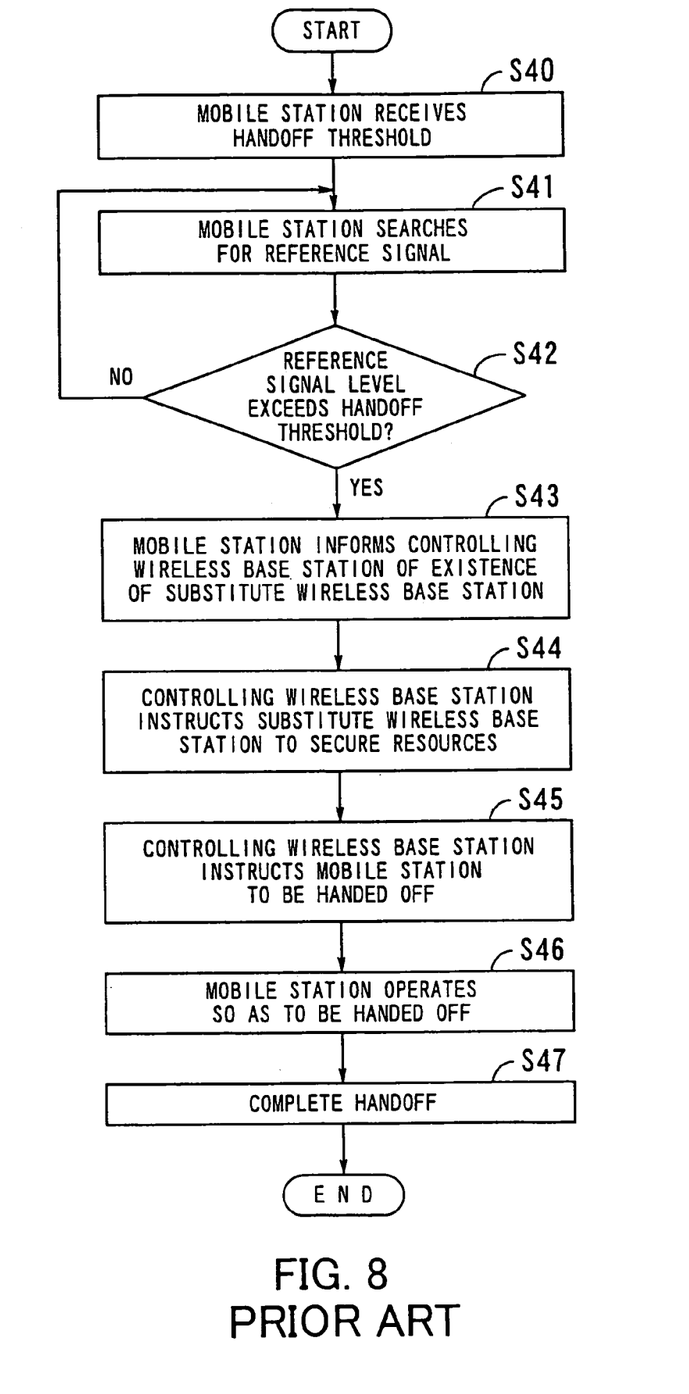
FIG. 8 is a flow diagram illustrating a typical one of the conventional operations for achieving a handoff.

FIG. 8 is a flow diagram illustrating an outline of a typical one of the conventional operations for achieving a handoff in the conventional mobile communication networks.

In step S40, the mobile station receives a predetermined handoff threshold from a wireless base station currently controlling the mobile station, which is hereinafter called a currently controlling wireless base station.

In step S41, the mobile station constantly searches for a reference signal from each of at least one other wireless base station.

In step S42, the mobile station compares the monitored reference signal with the above handoff threshold. When the level of the monitored reference signal exceeds the above handoff threshold, the operation goes to step S43. When the level of the monitored reference signal does not exceed the above handoff threshold, the operation goes to step S41. Conventionally, the hand-off threshold is a constant.

In step S43, the mobile station sends a report signal to the currently controlling wireless base station, where the report signal indicates that there is a candidate for a substitute wireless base station to which control of the mobile station is to be handed off.

In step S44, when the currently controlling wireless base station receives the report signal from the mobile station, and confirms validity of the contents of the report signal, the currently controlling wireless base station instructs the candidate for the substitute wireless base station to secure resources, such as a traffic channel, for use in control of the mobile station.

In step S45, the currently controlling wireless base station sends to the mobile station an over-the-air message through a traffic channel or a control channel, where the over-the-air message instructs the mobile station to hand off the control to the substitute wireless base station, and includes information such as frequencies and spreading codes to be used between the mobile station and the substitute wireless base station.

In step S46, when the mobile station receives the over-the-air message, the mobile station switches a communication channel from the currently controlling wireless base station to the substitute wireless base station.

In step S47, a communication path is established between the mobile station and the substitute wireless base station. Thus, the operation for achieving a handoff is completed.

However, the conventional handoffs as described above have the following drawbacks.

Figure 9:
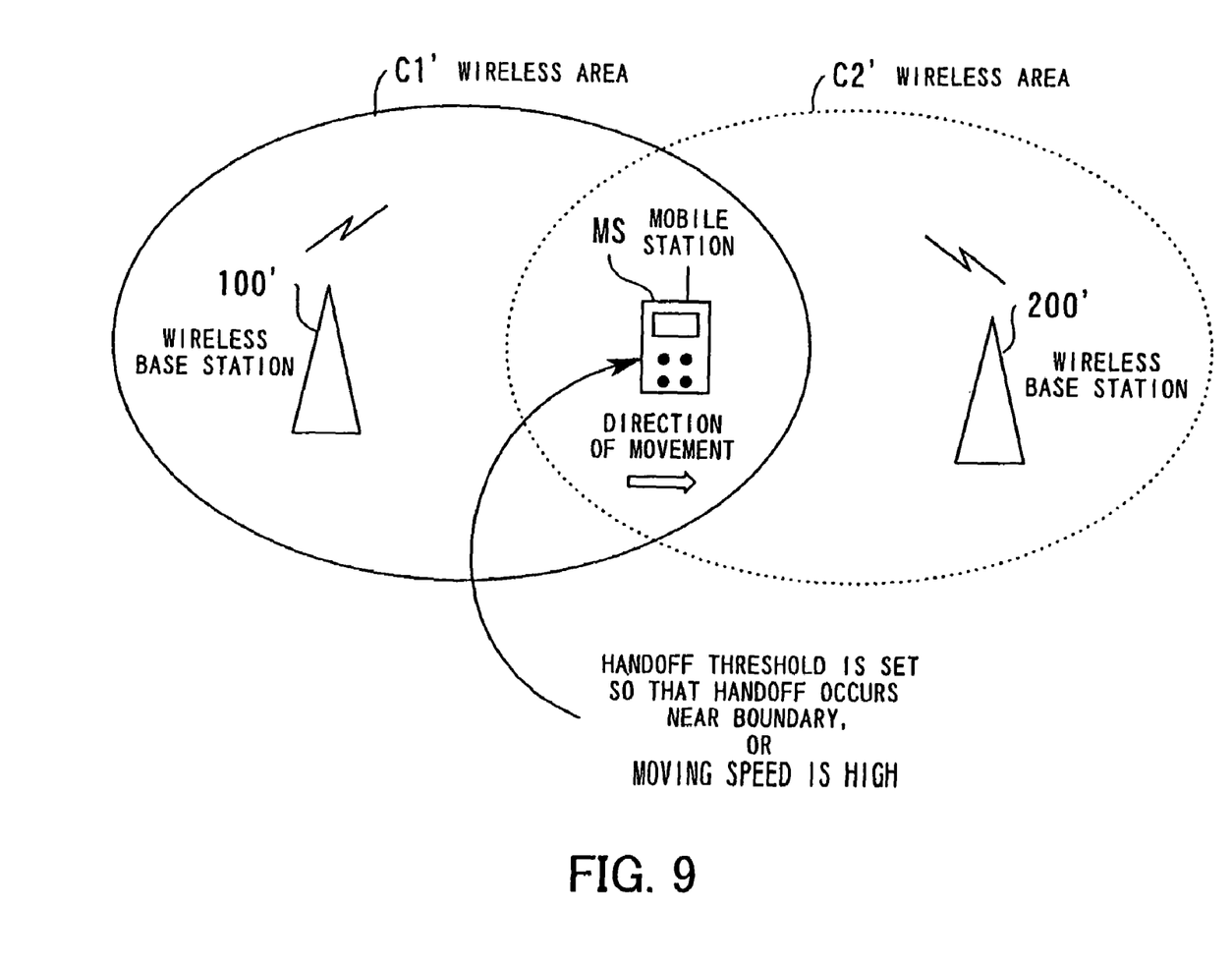
FIG. 9 is a diagram illustrating an example of a situation in which the handoff is liable to fail.

FIG. 9 is a diagram illustrating an example of a situation in which the handoff is liable to fail. In the situation of FIG. 9, the wireless base stations 100 and 200 are arranged in the areas C1 and C2, respectively. The mobile station MS is currently connected to the wireless base station 100, and is moving toward the wireless base station 200. However, if the handoff threshold so high that the level of the reference signal from the wireless base station 200 exceeds the handoff threshold in the vicinity of the boundary of the area C1, it is probable that quality (quality of the wireless link, received field strength, and the like) of a wireless signal received from the currently controlling wireless base station to the mobile station MS deteriorates. Therefore, the over-the-air message from the currently controlling wireless base station may not be successfully received by the mobile station, and thus the handoff may not succeed. In addition, when the moving speed of the mobile station is high, the probability of failure in the handoff is further increased.

In some regions in the service area of a mobile communication network, a complex boundary may be formed between different areas covered by different wireless base stations, due to fading or shadowing. When a mobile station moves in such regions, an unnecessarily great number of handoffs may be performed.

Figure 10:
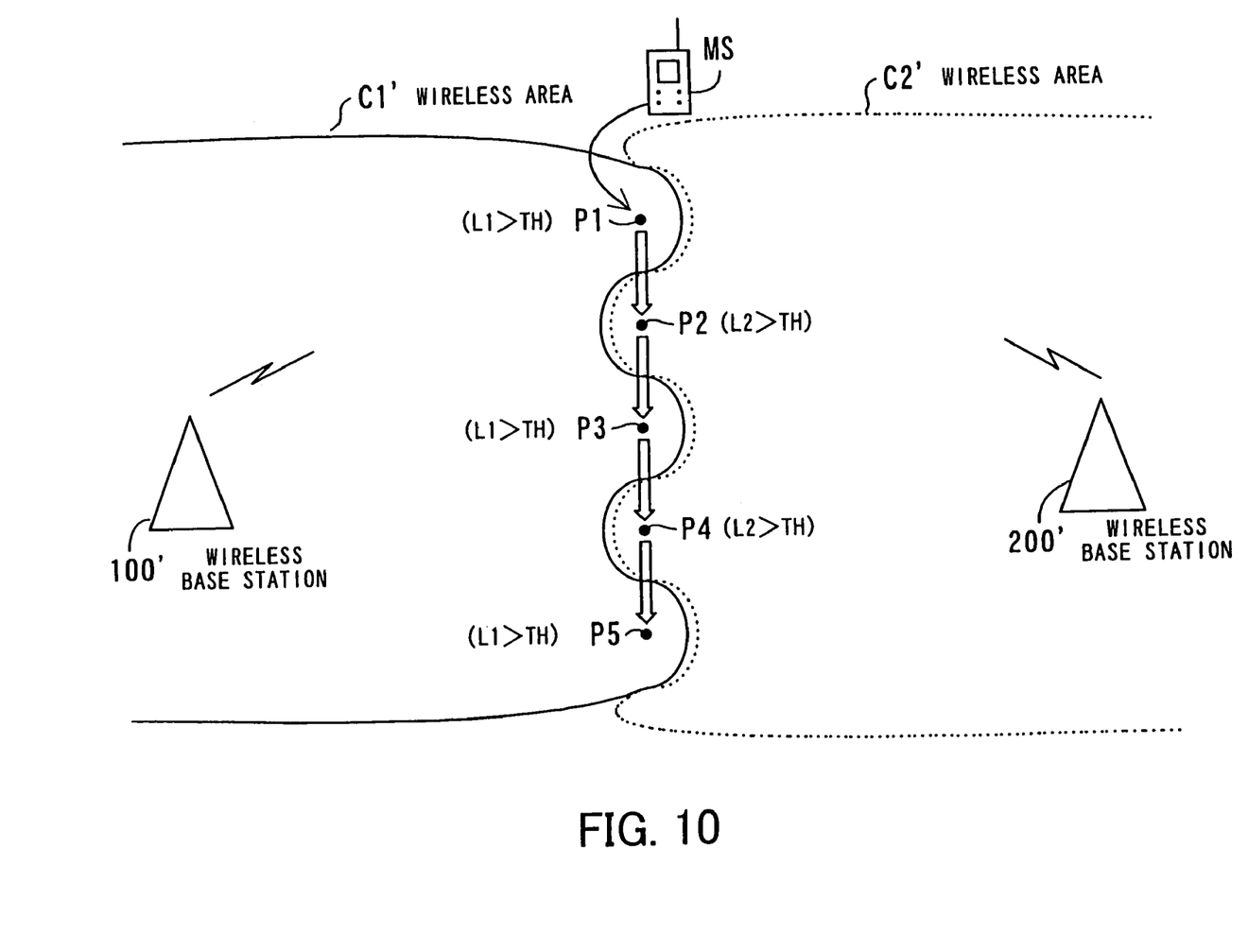
FIG. 10 is a diagram illustrating an example of a situation in which a mobile station MS moves through a region in which a complex boundary is formed between different areas C1' and C2' respectively covered by different wireless base stations 100' and 200'.

FIG. 10 is a diagram illustrating an example of a situation in which a mobile station MS moves through a region in which a complex boundary is formed between different areas C1' and C2' respectively covered by different wireless base stations 100' and 200'. As illustrated by arrows in FIG. 10, the mobile station MS crosses the complex boundary four times. In this situation, the levels L1 of the reference signal from the wireless base station 100'at the points P1, P3, and P5 are greater than the handoff threshold TH, and the levels L2 of the reference signal from the wireless base station 200' at the points P2 and P4 are also greater than the handoff threshold TH. Therefore, when the mobile station MS moves through the path indicated by the arrows in FIG. 10, the handoffs are performed unnecessarily frequently.

SUMMARY OF THE INVENTION

An object of the present invention is to provide a method of handing off a mobile station in a mobile communication system including at least one mobile station and at least two wireless base stations, whereby the probability of success in a handoff is enhanced, and a stable call condition is maintained.

Another object of the present invention is to provide a mobile communication system including at least one mobile station and at least two wireless base stations, wherein the probability of success in a handoff is enhanced, and a stable call condition is maintained.

A further object of the present invention is to provide a wireless communication control apparatus provided in a mobile communication system including at least one mobile station and at least two wireless base stations, whereby the probability of success in a handoff is enhanced, and a stable call condition is maintained.

(1) According to the first aspect of the present invention, there is provided a method of handing off a mobile station in a mobile communication system including first and second wireless base stations, comprising the steps of: (a) varying a handoff threshold which is set in the mobile station, according to quality of a wireless link between the mobile station and the first wireless base station which currently controls the mobile station; and (b) handing off the mobile station from the first wireless base station to the second wireless base station, based on the handoff threshold.

(2) According to the second aspect of the present invention, there is provided a mobile communication system comprising at least one mobile station and at least two wireless base stations. Each of the at least two wireless base stations comprises a handoff threshold varying unit which varies a handoff threshold which is set in one of the at least one mobile station, according to quality of a wireless link between the mobile station and the wireless base station which currently controls the mobile station, and a handoff processing unit which executes processing for handing off the mobile station from the wireless base station to another of the at least two wireless base stations, based on the handoff threshold.

Instead of being included in each of the at least two wireless base stations, the handoff threshold varying unit and the handoff processing unit may be included in each mobile station, or in a mobile switching center provided in the mobile communication system.

(3) According to the third aspect of the present invention, there is provided a wireless communication control apparatus comprising: a handoff threshold varying unit which varies a handoff threshold which is set in a mobile station, according to quality of a wireless link between the mobile station and a wireless base station which currently controls the mobile station, and a handoff processing unit which executes processing for handing off the mobile station from the wireless base station to another wireless base station, based on the handoff threshold.

The wireless communication control apparatus according to the third aspect of the present invention may also have one or any possible combination of the following additional features (i) to (vii).

(i) The handoff threshold varying unit may vary the handoff threshold on a real-time basis.

(ii) In addition to the feature (i), the wireless communication control apparatus may further comprise a quality obtaining unit which obtains, before performing the operation of the handoff threshold varying unit, information on the quality of the wireless link between the mobile station and the wireless base station which currently controls the mobile station.

(iii) The wireless communication control apparatus according to the third aspect of the present invention may further comprise a quality-versus-threshold table which indicates a relationship between the handoff threshold and the quality.

(iv) The handoff threshold varying unit may lower the handoff threshold when the quality of the wireless link drops below a predetermined level.

(v) The wireless communication control apparatus according to the third aspect of the present invention may further comprise a handoff limiting unit which stops the processing for handing off the mobile station to the said another wireless base station when a frequency of handoffs of the mobile station to the said another wireless base station exceeds a predetermined frequency.

(vi) In addition to the feature (v), the handoff limiting unit may raise the handoff threshold when the handoff limiting unit stops the processing for handing off the mobile station.

(vii) In addition to the feature (vi), the handoff processing unit may executes the processing for achieving the handoff, when the mobile station receives from the said another wireless base station a reference signal having quality exceeding the handoff threshold raised by the handoff limiting unit.

The wireless communication control apparatus according to the third aspect of the present invention may be included in each wireless base station, each mobile station, or a mobile switching center.

(4) According to the fourth aspect of the present invention, there is provided a product for use with a wireless communication control apparatus. When used with the wireless communication control apparatus, the product is able to output control information which directs the wireless communication control apparatus to comprise a handoff threshold varying unit which varies a handoff threshold which is set in a mobile station, according to quality of a wireless link between the mobile station and a wireless base station which currently controls the mobile station, and a handoff processing unit which executes processing for handing off the mobile station from the wireless base station to another wireless base station, based on the handoff threshold.

The product according to the fourth aspect of the present invention may have one or any possible combination of the aforementioned additional features from (i) to (vii).

(5) According to the above first to fourth aspects of the present invention, the handoff threshold can be varied according to the quality of the wireless link between the mobile station and the currently controlling base station so that a sequence of messages necessary for achieving a handoff can be transmitted between the mobile station and the currently controlling base station before the quality of the wireless link deteriorates too greatly. Therefore, the probability of success in the handoff can be enhanced, and thus it is possible to maintain a stable call condition.

In addition, when a relationship between the quality deterioration and the handoff threshold is prepared in advance in the form of a quality-versus-threshold table (as in the above additional feature (iii)), the handoff threshold value set in the mobile station can be quickly varied by using the quality-versus-threshold table.

Further, when an identical handoff which is requested after the number of identical handoffs reaches, within a predetermined time, a predetermined number is cancelled (as in the above additional feature (v)), it is possible to limit the number of identical handoffs occurred within a predetermined time, even when the mobile station moves in a region in which at least one complex boundary of areas covered by different wireless base stations exists. In addition, the possibility that the level of the reference signal received from another wireless base station exceeds the handoff threshold is further decreased by raising the handoff threshold which is set in the mobile station when the handoff is cancelled (as in the above additional feature (vi)). Thus, in this case, the frequency of handoffs is further decreased.

Consequently, according to the present invention, both of the frequency of handoffs and the frequency of failures in handoff are decreased, and it is therefore possible to provide stable service to users.

The above and other objects, features and advantages of the present invention will become apparent from the following description when taken in conjunction with the accompanying drawings which illustrate preferred embodiment of the present invention by way of example.

DESCRIPTION OF THE PREFERRED EMBODIMENTS

Embodiments of the present invention is explained below with reference to drawings.

(1) Basic Construction

Figure 1:
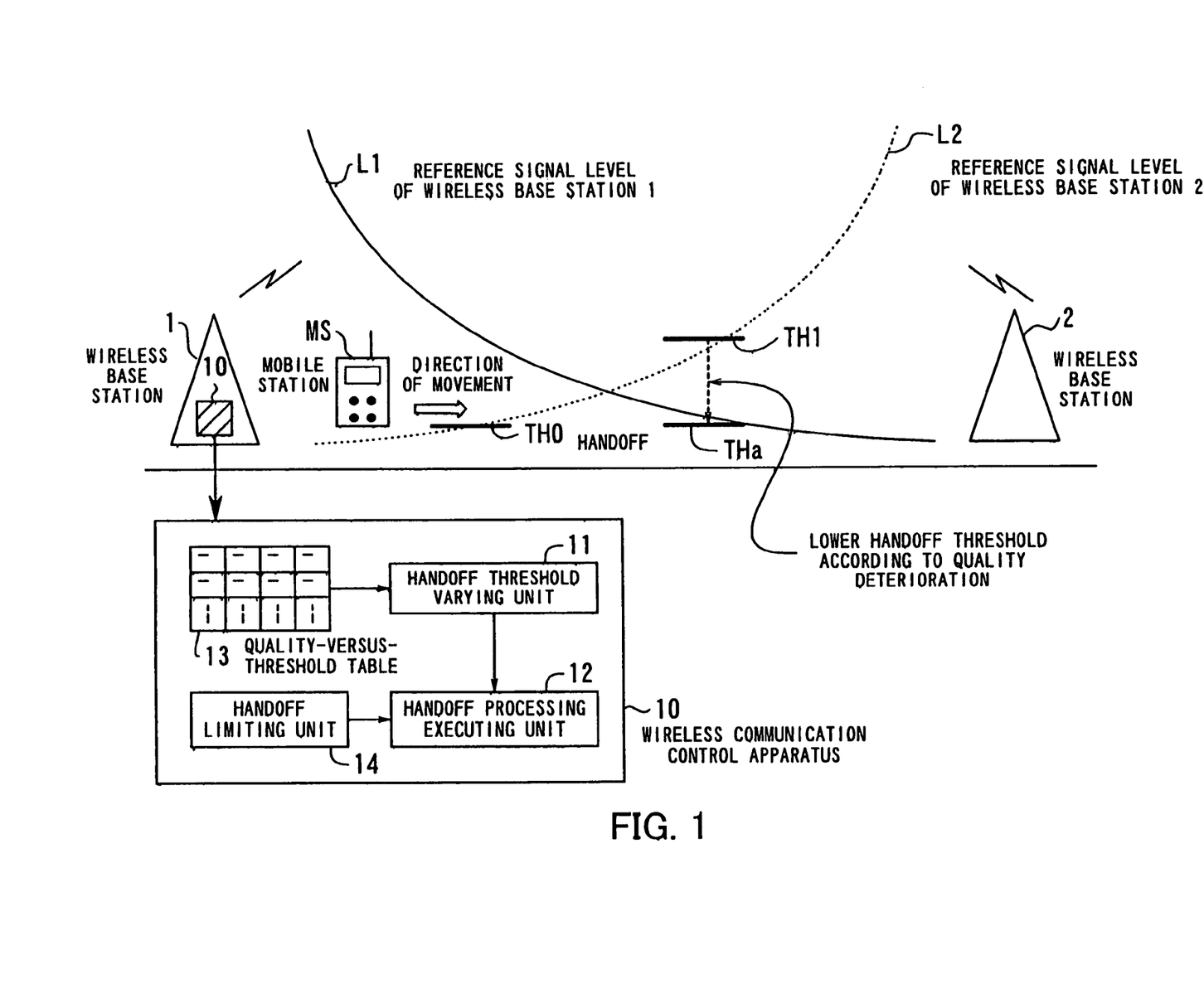
FIG. 1 is a diagram illustrating a simplified configuration of the mobile communication system according to the second aspect of the present invention, provided for explaining the basic principle of the first aspect of the present invention, and FIG. 1 also shows the basic construction of the wireless communication control apparatus according to the third aspect of the present invention.

FIG. 1 is a diagram illustrating a simplified configuration of the mobile communication system according to the second aspect of the present invention, provided for explaining the basic principle of the first aspect of the present invention, and FIG. 1 also shows the basic construction of the wireless communication control apparatus according to the third aspect of the present invention, which is provided in the mobile communication system for executing the method according to the first aspect of the present invention. The method of handing off a mobile station according to the first aspect of the present invention is performed in a wireless communication system which includes more than two wireless base stations and at least one mobile station.

In the construction of FIG. 1, each of the wireless base stations 1 and 2 contains a wireless communication control apparatus 10, which comprises a handoff threshold varying unit 11, a handoff processing executing unit 12, a quality-versus-threshold table 13, and a handoff limiting unit 14. Although the wireless communication control apparatus 10 in FIG. 1 is contained in each of the wireless base stations 1 and 2, the wireless communication control apparatus 10 may be contained in each mobile station MS or a mobile switching center (not shown).

The handoff threshold varying unit 11 varies a handoff threshold which is set in each mobile station MS, according to a quality level of a wireless link between the mobile station MS and the wireless base station which controls the mobile station MS. In particular, in the case where the wireless communication control apparatus 10 is provided in each wireless base station, the handoff threshold varying unit 11 varies a handoff threshold set in each mobile station MS under control of the wireless base station 1 which the handoff threshold varying unit 11 belongs to, according to a quality level of a wireless link between the mobile station MS and the wireless base station. For example, the quality level of the wireless link includes an error rate and the received field strength. The handoff threshold varying unit 11 may lower the handoff threshold value which is set in a mobile station when the quality level of the wireless link between the wireless base station 1 and the mobile station drops below a predetermined level. The handoff processing executing unit 12 performs an operation which is necessary to achieve a handoff. The quality-versus-threshold table 13 is a table which holds handoff threshold values corresponding to the quality levels of the wireless link. The handoff limiting unit 14 stops an operation of achieving a handoff when the frequency of handoffs of an identical mobile station to an identical substitute wireless base station which have occurred exceeds a predetermined frequency.

In addition, the handoff threshold varying unit 11 may raise the handoff threshold which is set in a mobile station MS, when the handoff limiting unit 14 stops the operation of achieving the handoff of the mobile station MS. In this case, when the mobile station receives from another wireless base station a reference signal having a level above the handoff threshold, the handoff processing executing unit 12 performs an operation which is necessary to achieve a handoff.

(2) Principle and Operation

The principle and operation of the present invention are explained below.

Each mobile station searches for at least one reference signal transmitted from at least one wireless base station. When one of the at least one mobile station finds that the level of one of the at least one reference signal exceeds the predetermined handoff threshold, the mobile station sends a request for a handoff, to a wireless base station which currently controls the mobile station. In the example illustrated in FIG. 1, the wireless base station 1 currently controls the mobile station MS, and the mobile station MS is moving toward the wireless base station 2.

When the handoff threshold is initially set at a relatively low level, e.g., at the level TH0 as illustrated in FIG. 1, the mobile station MS can detect that the level of the reference signal L2 received from the wireless base station. 2 exceeds the initial handoff threshold TH0, at a position at which the level of the reference signal L1 received from the wireless base station 1 is still high, and the level of the reference signal L2 received from the wireless base station 2 is still low. Therefore, in this case, the over-the-air message transmitted from the wireless base station 1 can reach the mobile station MS with sufficiently high quality. Thus, the over-the-air message transmitted from the wireless base station 1 can be successfully received by the mobile station MS with high probability, and it is very likely that the handoff operation succeeds.

When the handoff threshold is initially set at a relatively high level, e.g., at the level TH1 as illustrated in FIG. 1, the level of the reference signal L1 received from the wireless base station 1 is low, and the level of the reference signal L2 received from the wireless base station 2 is high, at the position at which the mobile station MS can detect that the level of the reference signal L2 received from the wireless base station 2 exceeds the initial handoff threshold TH1. Therefore, in this case, it is not probable that the over-the-air message transmitted from the wireless base station 1 can reach the mobile station MS with sufficiently high quality, and the handoff operation is liable to fail.

Taking the above characteristic into consideration, according to the present invention, the wireless communication control apparatus 10 monitors the quality of the wireless link between the mobile station MS and the wireless base station which currently controls the mobile station MS. The quality of the wireless link deteriorates when the mobile station MS moves away from the wireless base station which currently controls the mobile station MS. When the wireless communication control apparatus 10 detects deterioration of the quality of the wireless link between the mobile station MS and the wireless base station which currently controls the mobile station MS, the handoff threshold varying unit 11 lowers the handoff threshold which is set in the mobile station MS. The lowered handoff threshold is such that the mobile station MS can receive the reference signal transmitted from the wireless base station which currently controls the mobile station MS, with sufficiently high quality at the position at which the mobile station MS detects that the level of a reference signal received from another wireless base station exceeds the lowered handoff threshold. Thus, the wireless communication control apparatus 10 lowers the handoff threshold which is set in the mobile station MS. For example, the threshold varying unit 11 lowers the handoff threshold which is set in the mobile station MS, from the value TH1 to the value THa as illustrated in FIG. 1.

Due to the above operation of the handoff threshold varying unit 11, the mobile station MS can receive signals (such as the over-the-air message) from the wireless base station which currently controls the mobile station MS, with sufficiently high quality, even when the initial hand-off threshold set in the mobile station is so high that the position at which the mobile station detects that the level of a reference signal received from another wireless base station exceeds the lowered handoff threshold is near the boundary of the area covered by the wireless base station which controls the mobile station. In addition, the mobile station MS can also receive signals (such as the over-the-air message) from the wireless base station which currently controls the mobile station MS, with sufficiently high quality, even when the mobile station MS approaches the boundary at high speed. Thus, the probability of success in the operation for achieving a handoff can be enhanced.

Figure 2:
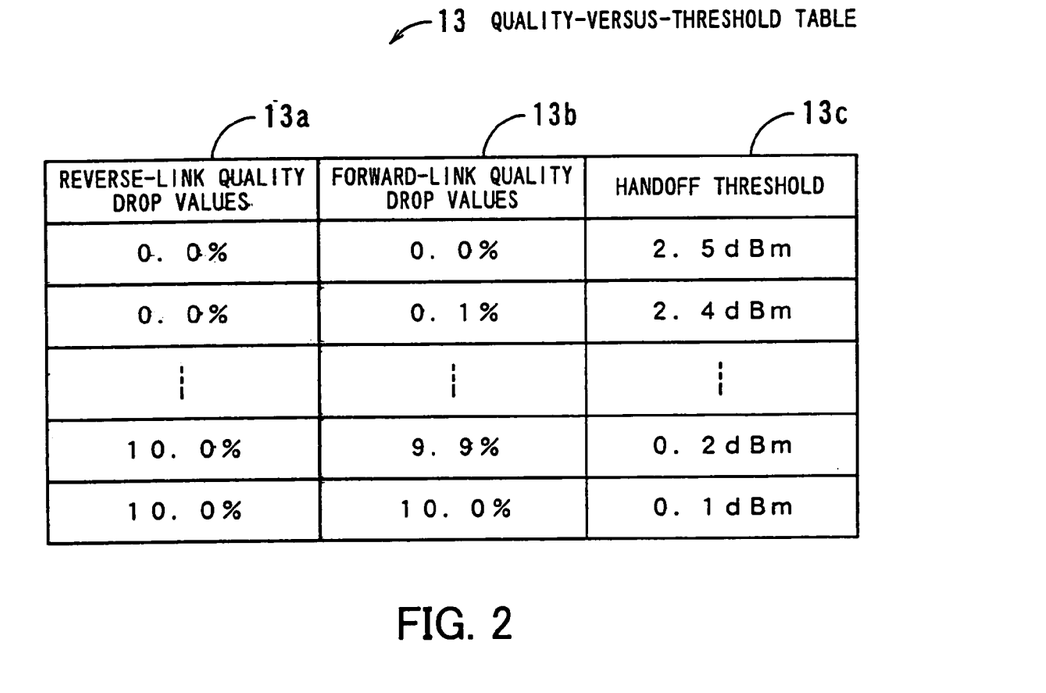
FIG. 2 is a diagram illustrating an example of a quality-versus-threshold table used in an embodiment of the present invention.

When the handoff threshold varying unit 11 lowers the handoff threshold, the quality-versus-threshold table 13 may be used. FIG. 2 is a diagram illustrating an example of the quality-versus-threshold table used in the embodiment of the present invention. The quality-versus-threshold table 13 of FIG. 2 contains values of the handoff threshold 13c corresponding to reverse-link quality drop values 13a and forward-link quality drop values 13b, which represent, in percentage, amounts of quality drop on the reverse and forward links, respectively. The values of the handoff threshold 13c in the quality-versus-threshold table 13 of FIG. 2 are target values of the handoff threshold, and represented in dBm. In the example of FIG. 2, the initial value of the handoff threshold is 2.5 dBm, which is the handoff threshold when the reverse-link quality drop values 13a and the forward-link quality drop values 13b are 0.0%. The quality of the wireless link between the mobile station MS and the wireless base station deteriorates with increase in the distance between the mobile station MS and the wireless base station. As illustrated in FIG. 2, the values of the handoff threshold 13c indicated in the quality-versus-threshold table 13 are determined so as to be lowered with increase in the amount representing quality drop in the reverse and forward links.

Thus, the handoff threshold value which is set in the mobile station MS can be efficiently and adaptively varied on a real-time basis according to the circumstances by using the quality-versus-threshold table 13.

Although the quality-versus-threshold table 13 in FIG. 2 contains both of the reverse-link quality drop values 13a and the forward-link quality drop values 13b, it is possible to separately provide a reverse-link-quality-versus-threshold table and a forward-link-quality-versus-threshold table, where the -reverse-link-quality-versus-threshold table contains the values of the handoff threshold 13c corresponding to the reverse-link quality drop values 13a, and the forward-link-quality-versus-threshold table contains the values, of the handoff threshold 13c corresponding to the forward-link quality drop values 13b.

Figure 3:
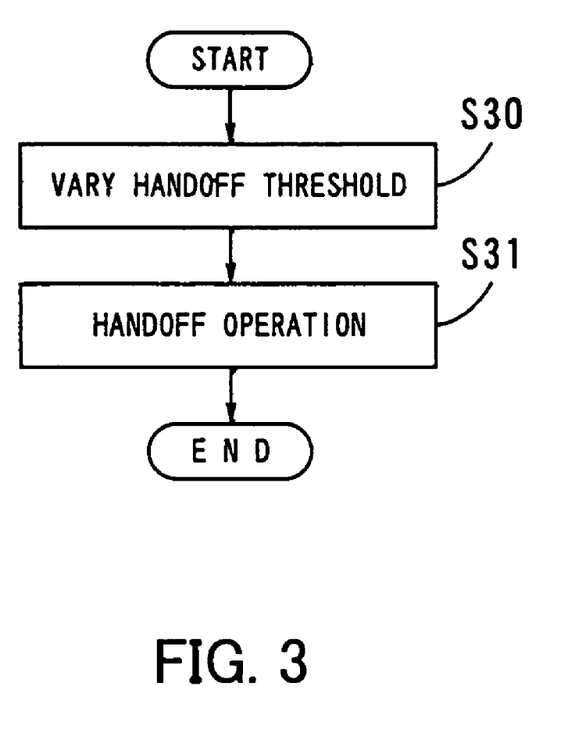
FIG. 3 is a flow diagram illustrating the basic steps of the method of handing off a mobile station, executed in a wireless base station according to the first aspect of the present invention.

FIG. 3 is a flow diagram illustrating the basic steps of the method of handing off a mobile station, according to the first aspect of the present invention.

In step S30, a handoff threshold which is set in the mobile station is varied according to quality of a wireless link between the mobile station and the wireless base station which controls the mobile station.

In step S31, processing for achieving a handoff is performed based on the handoff threshold varied In step S30. When the operation for achieving a handoff is completed, the handoff threshold which is set in the mobile station is returned to the initial value.

(3) Limit of Frequent handoffs

Figure 4:
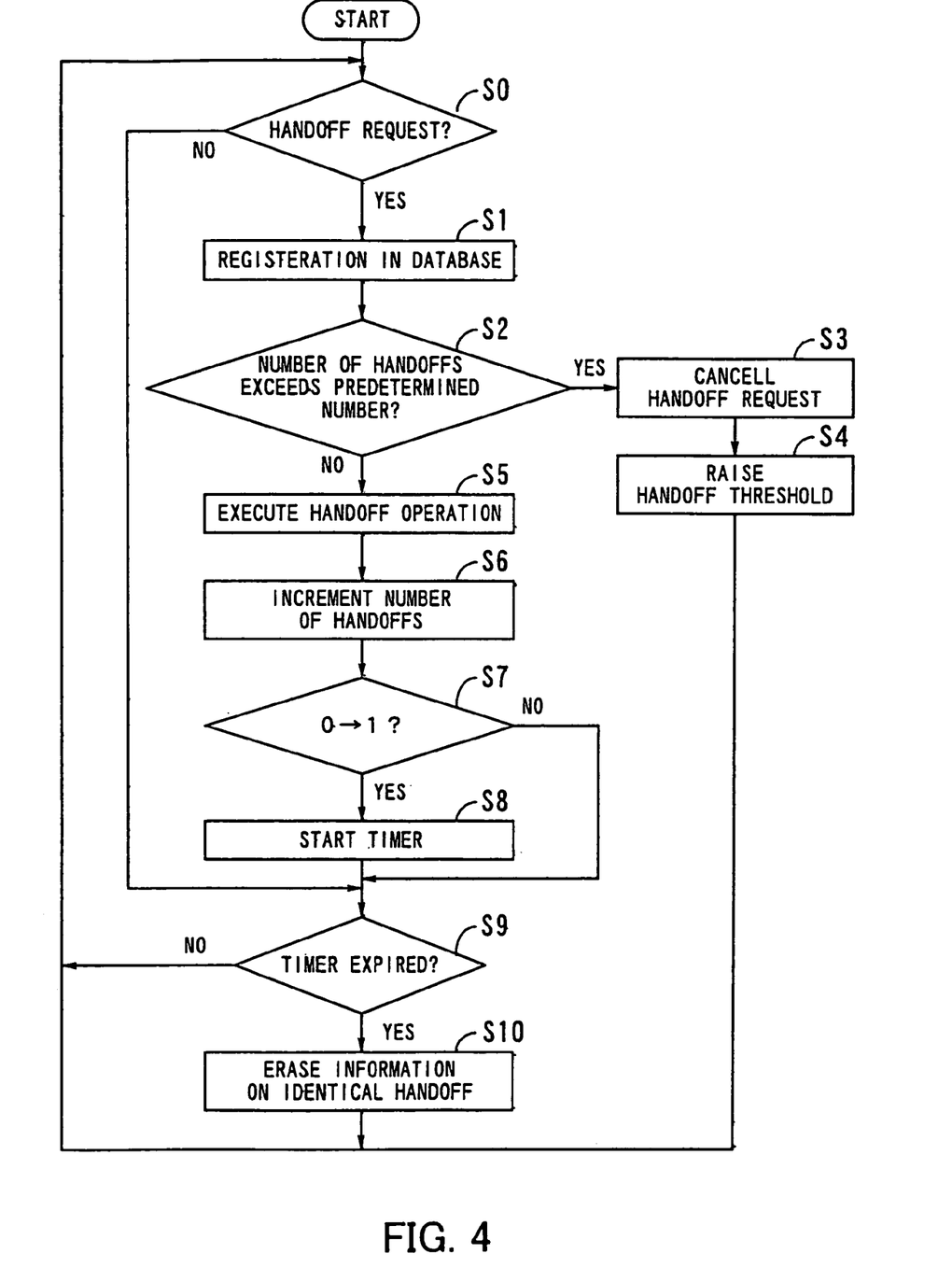
FIG. 4 is a flow diagram illustrating an example of an operation performed for limiting the number of identical handoffs.

The operation of the handoff limiting unit 14 is explained below with reference to FIG. 4. FIG. 4 is a flow diagram illustrating an example of an operations performed for limiting the number of identical handoffs, in which control of an identical mobile station is transferred from an identical currently controlling wireless base station to an identical substitute wireless base station.

In step S0, the handoff limiting unit 14 determines whether or not a request for a handoff is received from .a mobile station. When yes is determined, the operation goes to step S1. When no is determined, the operation goes to step S9.

In step S1, the handoff limiting unit 14 registers in a database a base station number of the wireless base station which the handoff limiting unit 14 belongs to, a base station number of a substitute wireless base station to which the mobile station is to be handed off, and a received field strength of a reference signal transmitted from the substitute wireless base station.

In step S2, the handoff limiting unit 14 determines whether or not the number of handoff which have occurred to the same combination of the above substitute wireless base station and the above mobile station is more than or equal to a predetermined number. When yes is determined, the operation goes to step S3. When no is determined, the operation goes to step S5.

In step S3, the handoff limiting unit 14 cancels the request for the handoff which is received in step S1.

In step S4, the handoff limiting unit 14 raises a handoff threshold which is set in the above mobile station, and the operation goes back to step S0.

In step S5, the wireless communication control apparatus 10 (the handoff processing executing unit 12) performs an operation which is necessary to achieve a handoff.

In step S6, when the above handoff succeeds, the handoff limiting unit 14 increments a number which is registered as the number of handoffs which have occurred to the combination of the above substitute wireless base station and the above mobile station.

In step S7, the handoff limiting unit 14 determines whether or not the above registered number is one, i.e., whether or not the handoff has occurred for the first time. When yes is determined, the operation goes to step S8. When no is determined, the operation goes to step S9.

In step S8, the handoff limiting unit 14 starts a timer.

In step S9, the handoff limiting unit 14 determines whether or not the timer expires. When yes is determined, the operation goes to step S10. When no is determined, the operation goes back to step S0.

In step S10, the handoff limiting unit 14 erases the information registered in the database in step Si for the above combination of the substitute wireless base station and the mobile station, and the operation goes back to step S0.

Figure 5:
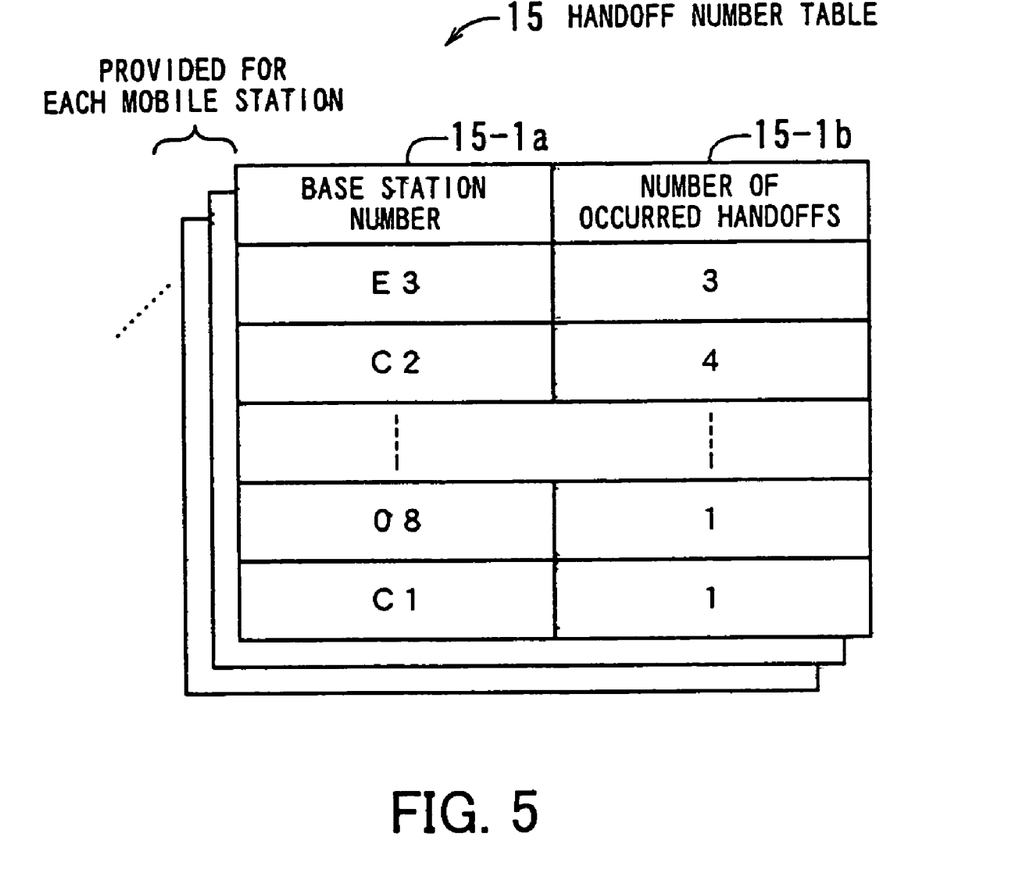
FIG. 5 is a diagram illustrating an example of a number-of-handoffs table 15 used in the operation of FIG. 4.

The above information registered in the database may be in the form of a handoff information table, which may contain a number-of-handoffs table provided for each mobile station. FIG. 5 is a diagram illustrating an example of the number-of-handoffs table 15 used in the operation of FIG. 4. The number-of-handoffs table 15 of FIG. 5 is provided for each mobile station, and each number-of-handoffs table contains a base station number 15-1a of a substitute wireless base station, and the number 15-1b of handoffs which have occurred to each combination of the substitute wireless base station and the mobile station. For example, the number-of-handoffs table of FIG. 5 shows that the number 15-1b of handoffs which have occurred to the combination of the substitute wireless base station E3 and a mobile station is three.

Figure 6:
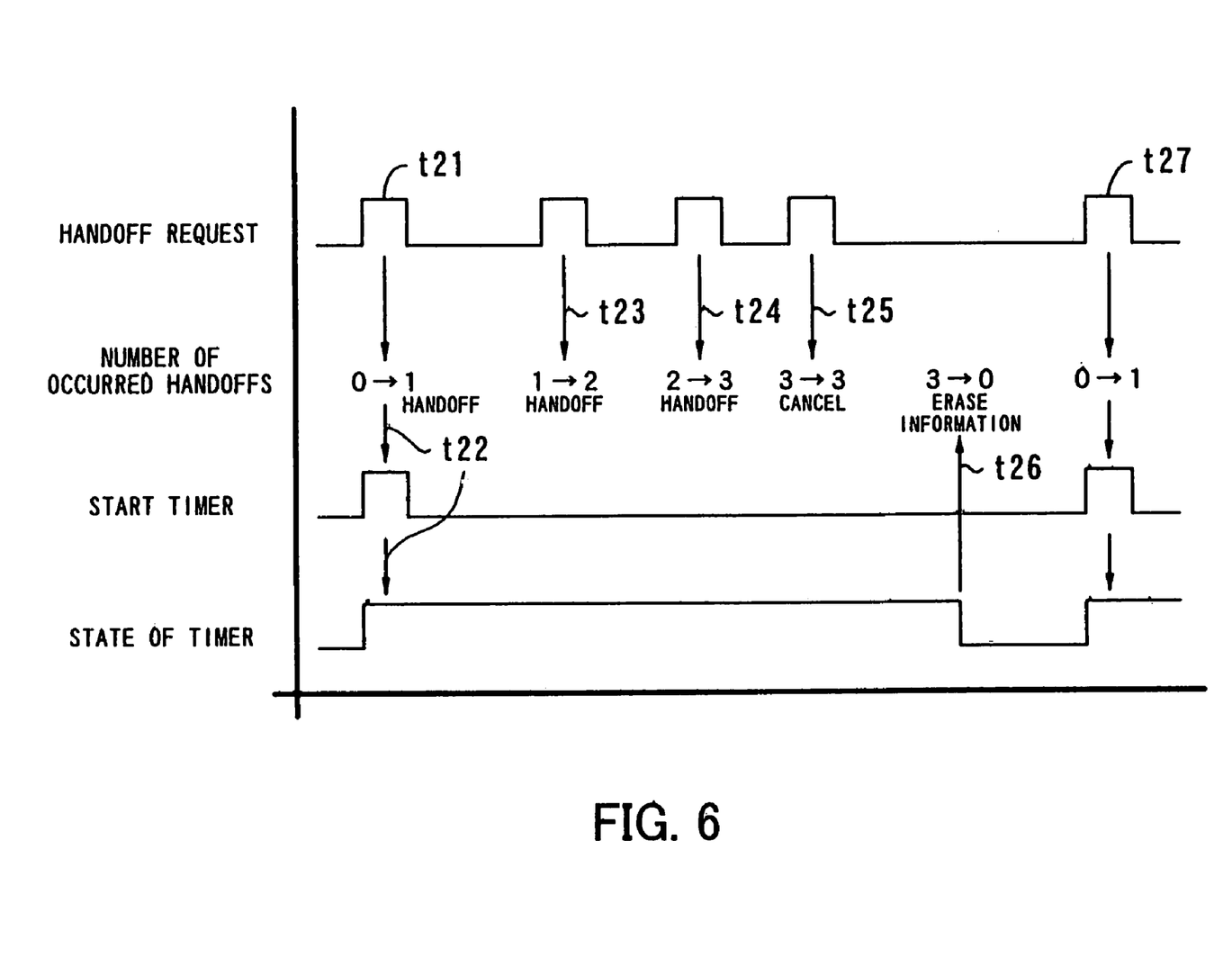
FIG. 6 is a timing diagram of an example of the operation of FIG. 4.

FIG. 6 is a timing diagram of an example of the operation of FIG. 4, where the predetermined number in step S2 in FIG. 4 is three.

At time t21, when the handoff limiting unit 14 receives, from a mobile station, the first request for a handoff of a mobile station from a wireless base station which currently controls the mobile station to a substitute wireless base station, the operation for achieving a handoff is performed in step S5 in FIG. 4, and the registered number of handoffs which have occurred to the combination of the substitute wireless base station and the mobile station is incremented by one in step S6 in FIG. 4, where the registered number of handoffs which have occurred to each combination is initially zero.

At time t22, the timer is started in step S8 in FIG. 4.

At time t23, the second request for a handoff to the same substitute wireless base station is received from the same mobile station, an operation for achieving the handoff is performed in step S5 in FIG. 4, and the registered number of handoffs which have occurred to the same combination of the substitute wireless base station and the mobile station is incremented by one in step S6 in FIG. 4.

At time t24, the third request for a handoff to the same substitute wireless base station is received from the same mobile station, an operation for achieving the handoff is performed in step S5 in FIG. 4, and the registered number of handoffs which have occurred to the same combination of the substitute wireless base station and the mobile station is further incremented by one in step S6.

At time t25, the fourth request for a handoff to the same substitute wireless base station is received from the same mobile station. Since the upper limit (the predetermined number) of the number of the handoffs is three, the third request for a handoff is canceled in step S3 in FIG. 4. That is, the registered number of handoffs which have occurred to the above combination of the substitute wireless base station and the mobile station is not incremented.

At time t26, the timer expires, and the handoff limiting unit 14 erases the information registered in the database for the above combination of the substitute wireless base station and the mobile station, in step S10 of FIG. 4. That is, the base station number of the wireless base station which the handoff limiting unit 14 belongs to, the base station number of the substitute wireless base station to which the mobile station is to be handed off, the received field strength of the reference signal transmitted from the substitute wireless base station, and the registered number of handoffs which have occurred to the combination of the substitute wireless base station and the mobile station are erased.

At time t27, the handoff limiting unit 14 receives, from a mobile station, a new request for a handoff of the mobile station from a wireless base station which currently controls the mobile station to a substitute wireless base station. Thereafter, similar operations are performed in accordance with FIG. 4.

As described above, in the example of FIG. 4, the handoff limiting unit 14 stops an operation for achieving a requested handoff when the number of the identical handoffs which have occurred to an identical mobile station and an identical substitute base station within a predetermined time exceeds a predetermined number. Therefore, even when the mobile station MS moves in a region in which at least one complex boundary exists, as indicated by the arrows in FIG. 10, the number of handoffs can be limited by the handoff limiting unit 14.

(4) Hardware Construction

Figure 7:
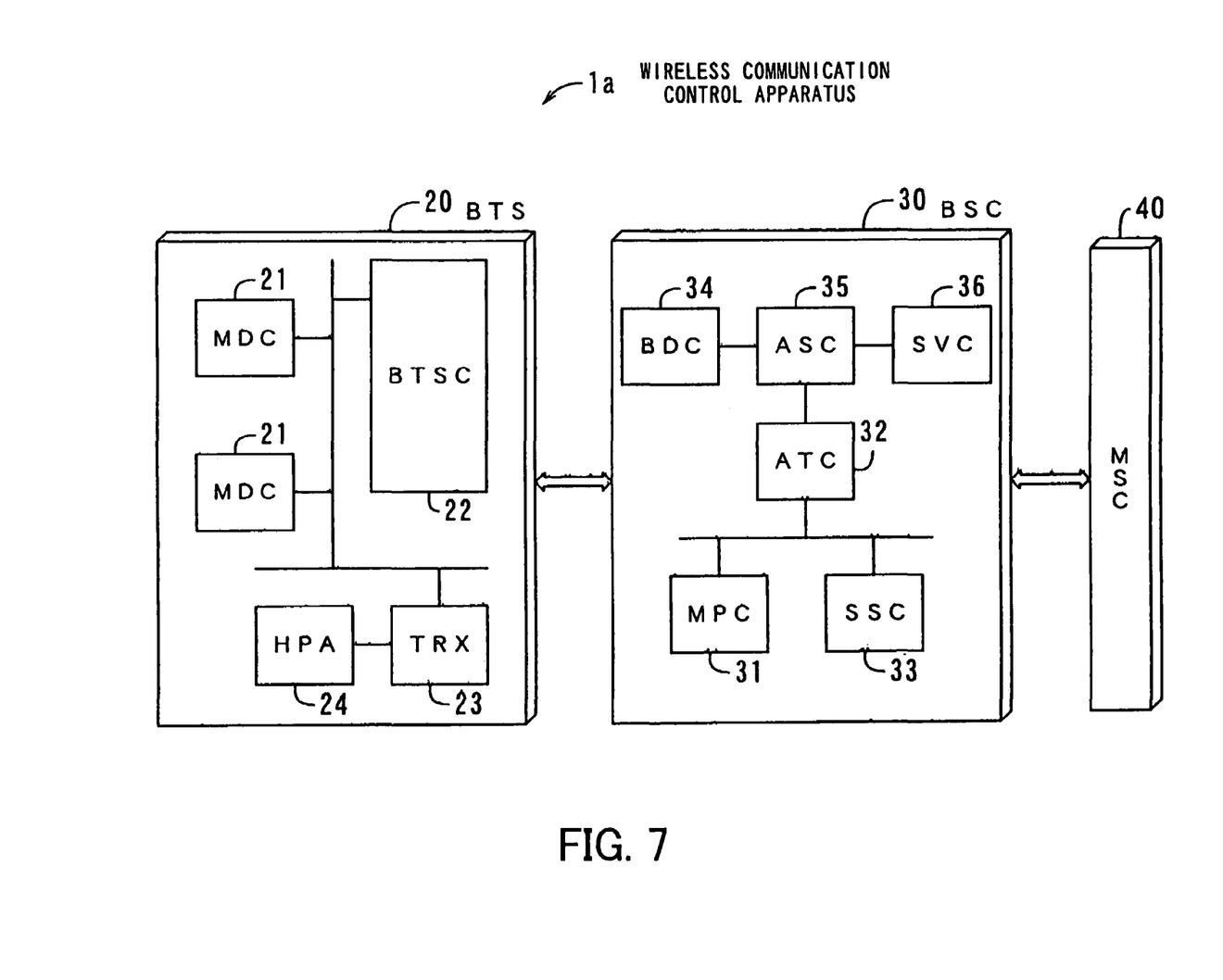
FIG. 7 is a diagram illustrating a hardware construction of a CDMA wireless base station as an example of a wireless base station including the wireless communication control apparatus 10.

FIG. 7 is a diagram illustrating a hardware construction of a CDMA wireless base station as an example of a wireless base station including the wireless communication control apparatus 10 according to the present invention. The CDMA wireless base station la of FIG. 7 includes a base station transceiver subsystem (BTS) 20, a base station controller (BSC) 30, and a mobile switching center (MSC) 40.

The base station transceiver subsystem (BTS) 20 is provided for realizing an air interface, and transmits and receives over-the-air signals. The mobile switching center (MSC) 40 provides interconnection services among mobile stations, and interconnection services with other landline networks. The base station controller (BSC) 30 functions as an interface between the base station transceiver subsystem (BTS) 20 and the mobile switching center (MSC) 40, controls connection and disconnection of calls, and performs protocol conversion (e.g., conversion between the IS-95A protocol and the A+ protocol).

The base station transceiver subsystem (BTS) 20 comprises a plurality of modem channel cards (MDCs) 21, a BTS controller 22, a transmitter receiver (TRX) 23, and a high power amplifier (HPA) 24.

The modem channel cards (MDCs) 21 perform processing of CDMA modulation land demodulation on baseband signals. That is, the modem channel cards (MDCs) 21 performs processing of CDMA modulation in accordance with IS-95A on packet data supplied from the base station controller (BSC) 30, generate CDMA modulated baseband signals, and send the CDMA modulated baseband signals to the transmitter receiver (TRX) 23. In addition, the modem channel cards (MDCs) 21 receive data which are received and sampled by the transmitter receiver (TRX) 23, and demodulates the data to regenerate symbols, and decode the symbol data.

The BTS controller 22 monitors and controls all of the constituents of the base station transceiver subsystem (BTS) 20, and functions as an interface between the modem channel cards (MDCs) 21 and the base station controller (BSC) 30.

The transmitter receiver (TRX) 23 is a wireless transmitter and receiver, and performs serial-to-parallel conversion, data addition, secondary modulation, transmission frequency conversion, reception frequency conversion, RSSI detection, demodulation, and the like. The high power amplifier (HPA) 24 amplifies transmission RF signals in the 800 MHz band.

The base station controller (BSC) 30 comprises a main processor control card (MPC) 31, an ATM layer control card (ATC) 32, an SS7 (signaling system No. 7) layer control card (SSC) 33, a BTS data processing common card (BDC) 34, an ATM switch processing common card (ASC) 35, and a selector vocoder card (SVC) 36.

The main processor control card (MPC) 31 is a main processor, which monitors and controls all of the constituents of the base station controller (BSC) 30, and controls connections for calls.

The ATM layer control card (ATC) 32 terminates the ATM layer, and controls ATM packets transferred between the base station transceiver subsystem (BTS) 20 and the base station controller (BSC) 30, and between the constituents of the base station controller (BSC) 30. The SS7 layer control card (SSC) 33 terminates the common channel signaling (SS7) system, which is a signaling protocol used between the base station controller (BSC) 30 and the mobile switching center (MSC) 40.

The BTS data processing common card (BDC) 34 terminates the E1 interface which is an interface between the base station controller (BSC) 30 and the base station transceiver subsystem (BTS) 20. The ATM switch processing common card (ASC) 35 controls routing between resources in the wired and the wireless systems, where the resources in the wired system include a vocoder provided in the selector vocoder card (SVC) 36, and the resources in the wireless system are provided in the modem channel cards (MDCs) 21.

The selector vocoder card (SVC) 36 multiplexes control signals and sound signals, performs processing of QCELP (Qualcomm code excited linear prediction) and PCM (pulse code modulation), and monitors quality of reverse-link frames transmitted from mobile stations.

The operations of the construction of FIG. 7 relating to the present invention are explained below.

The selector vocoder card (SVC) 36 detects quality deterioration of the reverse-link signals as follows.

The reverse-link signals received by the modem channel cards (MDCs) 21 are transformed into ATM cells, which are transferred to the selector vocoder card (SVC) 36 through the BTS data processing common card (BDC) 34 and the ATM switch processing common card (ASC) 35. The selector vocoder card (SVC) 36 transforms the ATM cells into signaling frames in accordance with the SS7 system, extracts symbol error information from the frames. The symbol error information is transferred from the selector vocoder card (SVC) 36 to the main processor control card (MPC) 31 through the ATM layer control card (ATC) 32.

Alternatively, the quality deterioration of the reverse-link signals may be detected from the signals received from the mobile stations by any other known methods.

On the other hand, each mobile station detects quality deterioration of the forward-link signals by calculation based on signals received from the base station transceiver subsystem (BTS) 20. The detected result of the quality deterioration is multiplexed with sound signals, and transmitted to the base station transceiver subsystem (BTS) 20 of the CDMA wireless communication control apparatus of FIG. 7. The modem channel cards (MDCs) 21 receive the signals representing the detected result of the quality deterioration. The received signals are transformed into ATM cells, and transferred to the selector vocoder card (SVC) 36 through the BTS data processing common card (BDC) 34 and the ATM switch processing common card (ASC) 35. The selector vocoder card (SVC) 36 transforms the ATM cells into signaling frames in accordance with the SS7 system, extracts information on the quality deterioration of the forward-link signals from the frames, which is then is transferred from the selector vocoder card (SVC) 36 to the main processor control card (MPC) 31 through the ATM layer control card (ATC) 32.

Thus, the information on the quality deterioration of the reverse-link and forward-link signals for each mobile station is finally collected by the main processor control card (MPC) 31. The main processor control card (MPC) 31 has a list indicating a relationship between the quality deterioration and the handoff threshold, where the list realizes the aforementioned quality-versus-threshold table 13. The main processor control card (MPC) 31 determines a value of the handoff threshold based on the list and the information on the quality deterioration of the reverse-link and forward-link signals. The determined value of the handoff threshold is transferred to the BTS controller 22 in the base station transceiver subsystem (BTS) 20 through the ATM layer control card (ATC) 32, the ATM switch processing common card (ASC) 35, and the BTS data processing common card (BDC) 34.

The BTS controller 22 generates a frame containing the handoff threshold value in accordance with a recommendation for an air interface, e.g., as recommended by IS-95A, and transfers the frame to the modem channel cards (MDCs) 21, which perform CDMA modulation on the frame to generate a CDMA modulated baseband signal. Then, the handoff threshold value in the form of the CDMA modulated baseband signal is transferred to the transmitter receiver (TRX) 23, to be transmitted to the mobile station with the aid of the high power amplifier (HPA) 24. When the mobile station receives the transmitted signal, the mobile station extracts the handoff threshold value from the received signal, and sets the handoff threshold value in the mobile station for use in the handoff operation.

In addition, the main processor control card (MPC) 31 controls the aforementioned operation of limiting the number of frequent handoffs as illustrated in FIG. 4, as follows.

The main processor control card (MPC) 31 has the aforementioned number-of-handoffs table 15 as illustrated in FIG. 5. When the modem channel cards (MDCs) 21 receives from mobile stations a signal indicating strength of a reference signal received from a substitute base station, the modem channel cards (MDCs) 21 transforms the signals into ATM cells, and transfers the ATM cells to the selector vocoder card (SVC) 36 through the BTS data processing common card (BDC) 34 and the ATM switch processing common card (ASC) 35. The selector vocoder card (SVC) 36 transforms the ATM cells into signaling frames in accordance with the SS7 system, and transfers the signaling frames to the main processor control card (MPC) 31. The main processor control card (MPC) 31 executes processing for achieving a handoff based on the information on the strength of the reference signal. The main processor control card (MPC) 31 also renews the number-of-handoffs table 15, and controls the timer. The main processor control card (MPC) 31 further manages the operations for achieving a handoff and changing the handoff threshold values. Information on the cancellation of a handoff and change of the handoff threshold value is generated by the main processor control card (MPC) 31, and transferred to the BTS controller 22 through the ATM layer control card (ATC) 32, the ATM switch processing common card (ASC) 35, and the BTS data processing common card (BDC) 34. The BTS controller 22 transforms the information into a frame in accordance with a recommendation for the air interface, e.g., as recommended by IS-95A, and transfers the frame to the modem channel cards (MDCs) 21, which perform CDMA modulation on the frame to generate a CDMA modulated baseband signal. Then, the information in the form of the CDMA modulated baseband signal is transmitted by the transmitter receiver (TRX) 23 to the mobile station with the aid of the high power amplifier (HPA) 24. When the mobile station receives the transmitted signal, the mobile station extracts the information from the signal, and performs a necessary operation in accordance with the information. For example, the mobile station sets the handoff threshold value included in the information, in the mobile station for use in an operation for achieving a handoff.

(5) Other Matters (i) In the operation of FIG. 4, the number of identical handoffs within a predetermined time is limited by counting the number of the identical handoffs occurred within a predetermined time by using a timer. However, the number of identical handoffs within a predetermined time may be counted by any other manners. For example, the number of identical handoffs occurred within a predetermined time can be detected by recording times and histories of the handoffs.

(ii) In the above embodiment, quality deterioration of the forward link is mainly monitored since the object of the present invention is to perform an operation for achieving a handoff, before the quality of the forward link deteriorates too greatly to send the over-the-air message to the mobile station. However, quality deterioration of the reverse link can be directly detected by the wireless base station, and it is probable that the quality of the forward link deteriorates when the quality of the reverse link deteriorates. Therefore, it is possible to monitor the quality deterioration of the reverse link only.

(iii) The wireless communication control apparatus 10 may be provided in each mobile station, instead of being provided in the wireless base station. In this case, quality deterioration of the forward link can be directly detected by each mobile station, and each mobile station can vary the hand-off threshold set in the mobile station, based on the quality deterioration of the forward link detected by the mobile station. Except for the provision for the mobile switching center (MSC) 40 and the interface with the mobile switching center (MSC) 40, a similar construction to the construction of FIG. 6 can be used in each mobile station.

(iv) Instead of providing the quality-versus-threshold table 13 as illustrated in FIG. 2, it is possible to simply raise the handoff threshold when the quality of the wireless link exceeds a predetermined level, and simply drop the handoff threshold when the quality of the wireless link drops below a predetermined level.

(v) In addition, the functions of the embodiment of the present invention may be realized by using a certain product with a wireless communication control apparatus, e.g., by installing a computer-readable medium in a computer. The product is such that when the product is used with the wireless communication control apparatus (e.g., a computer), the product is able to output control information which directs the wireless communication control apparatus to realize any of the above functions of the present invention. The product may be a semiconductor storage device storing a program which realizes the above functions, such as a ROM, or a magnetic storage medium such as a floppy disc or a hard disk, or a CD-ROM, a CD-R, a DVD-ROM, a DVD-RAM, a DVD-R, or the like. Further, the above product may be a programmed hardware logic circuit such as an LSI. The above product can be put into the market. Alternatively, program data realizing the above functions may be transferred through a communication network from a storage device included in a computer system to another computer system. When executing the program in a computer system, for example, the program stored in a hard disk may be loaded in a main memory of the computer system.

(vi) The foregoing is considered as illustrative only of the principle of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

(vii) All of the contents of the Japanese patent application, No. 11-248335 are incorporated into this specification by reference.

What is claimed is:

1. A base station used in a mobile communication system, the base station comprising:
   a counting table which counts a number of handoffs from said base station to each of adjacent base stations for detecting each handoff frequency,
   a handoff limiting unit which stops processing for handing off said mobile station to one adjacent base station in case that the handoff frequency for the mobile station from said base station to said one adjacent base station is over a predetermined frequency,
   wherein said handoff limiting unit raises a handoff threshold which is set in said mobile station when said handoff limiting unit stops said processing for handing off said mobile station.

* * * * *